Aug. 31, 1948.  A. J. YORGIADIS  2,448,133
BENDING FIXTURE
Filed Feb. 2, 1945

INVENTOR
A. J. Yorgiadis
BY
ATTORNEY

Patented Aug. 31, 1948

2,448,133

UNITED STATES PATENT OFFICE 2,448,133

BENDING FIXTURE

Alexander J. Yorgiadis, Greenwich, Conn., assignor, by mesne assignments, to The Baldwin Locomotive Works, a corporation of Pennsylvania Application February 2, 1945, Serial No. 575,815

11 Claims. (Cl. 73—100)

This invention relates generally to non-rotating type fatigue testing apparatus for testing specimens or members under bending fatigue conditions, and more particularly to a fixture for fatigue testing of specimens under repeated pure bending moment that is constant along the entire specimen test section at any instant during non-rotating flexure of the specimen.

The fixture disclosed herein is particularly, although not exclusively, adapted for use with a reciprocating type of variable amplitude constant alternating force fatigue testing machine. Hence, only a small part of the reciprocating machine itself is disclosed herein in order to illustrate the relation of the fixture to the machine. Specimens of material, particularly in sheet or plate form, are frequently tested in fatigue by bending the specimen back and forth at a high rate of speed but heretofore the specimen has not been tested with the entire test section subjected to the same bending moment, with consequent disadvantages. A further disadvantage of other systems of loading, and in particular of the commonly used cantilever loading, is that it subjects the specimen to vertical shear as well as to bending. Moreover, as the elastic properties of the specimen change during the course of the test, the amplitude of bending movement must vary if the applied repeated bending moment is to remain a constant.

It is an object of my invention to provide an improved non-rotatable specimen bending fixture of the reciprocating type that subjects the specimen to a uniform repeated bending moment all along the specimen test section and throughout the testing operation.

Another object is to provide an improved non-rotatable bending fixture of the reciprocating type that has complete freedom and flexibility in accommodating itself to a variable amplitude while accurately transmitting the applied force to the specimen with a uniform bending moment.

A further object is to provide an improved fixture of the reciprocating type that is relatively simple in construction, operation and maintenance and which allows a specimen to be placed quickly and easily in position.

A still further object is to provide an improved non-rotatable fatigue bending fixture of the reciprocating type that is adapted in a simple and expeditious manner to allow a change in the leverage of the force applied to the specimen whereby different bending moments may be produced for specimens of different lengths.

Other objects and advantages will be more apparent to those skilled in the art from the following description of the accompanying drawing in which.

As shown in said copending Lazan application, the testing machine includes a seismic frame 1 and a reciprocating vibratory specimen-engaging frame 2 which has a table 3 extending into an opening 4 in frame 1. The frame 2 is specifically shown as being vibratory in a vertical direction although this is purely a relative term inasmuch as my fixture is equally applicable to a machine which operates in a horizontal direction. The mechanism for vibrating the frame 2 is not disclosed herein as it does not constitute a part of my present invention.

Figure 1:
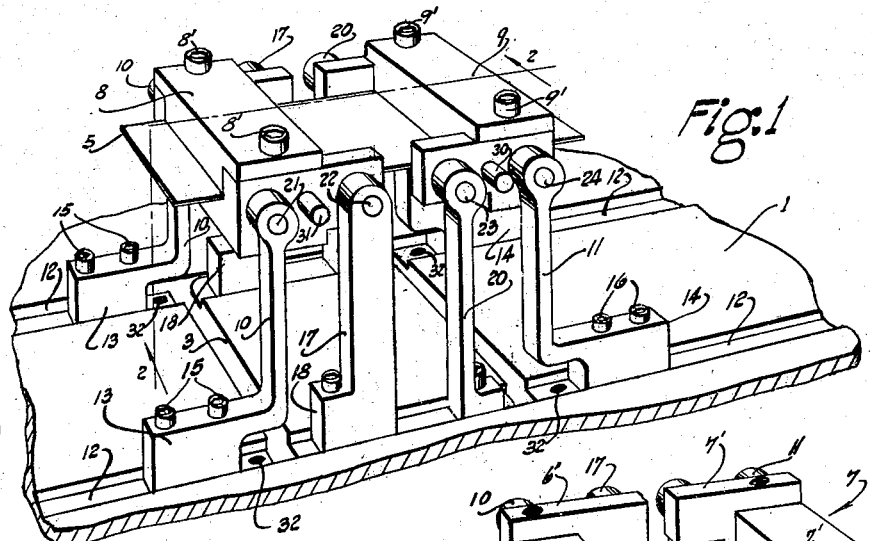
Fig. 1 is a perspective of my improved bending beam type fixture applied to a fragmentary portion of an alternating force fatigue testing machine.
Figure 3:
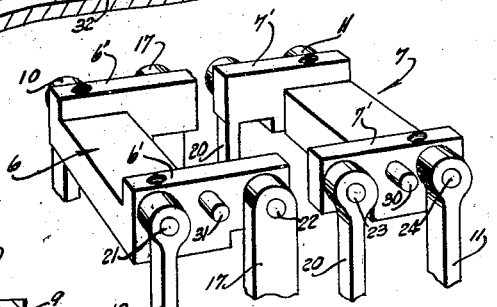
Fig. 3 is a fragmentary perspective of the fixture of Fig. 1 but with the removable clamping elements and specimen omitted.
Figure 2:
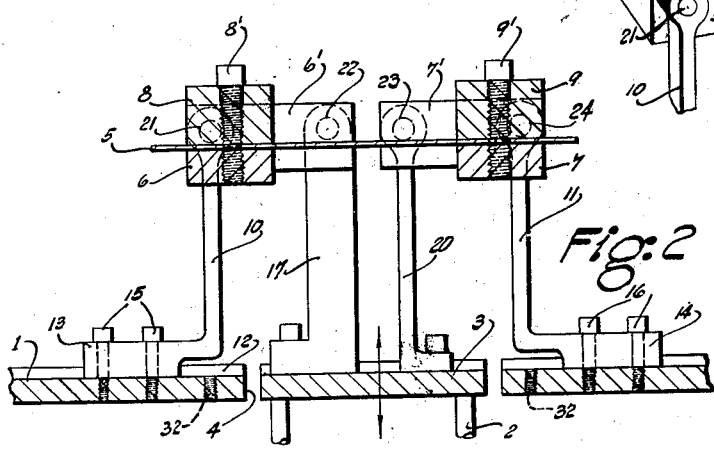
Fig. 2 is a vertical section taken substantially on the line 2—2 of Fig. 1.
Figure 4:
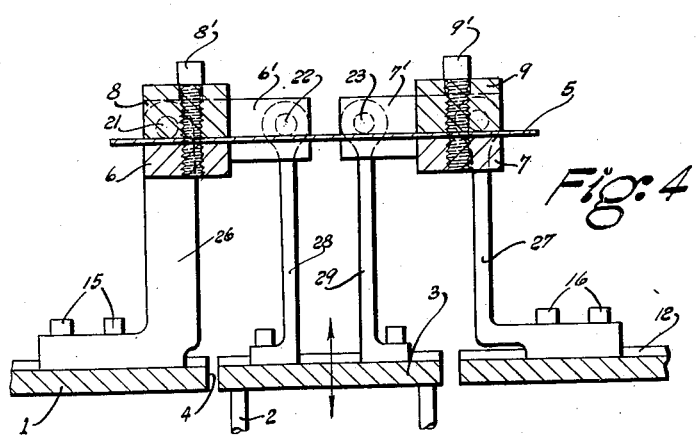
Fig. 4 is a section similar to Fig. 2 but showing a modified arrangement of the operating arms.

To support a flat specimen 5 which may be relatively thin sheet material the fixture is provided with two identical grip bases 6 and 7, Fig. 3, opposed to each other, and each being provided with clamping bars 8 and 9, Fig. 1, which clamp the specimen to bases 6 and 7 by screws 8' and 9' threaded in the side rails 6' and 7' of the bases. The outer ends of the grip bases are each pivotally supported upon vertical supporting arms 10 and 11 which are relatively thin to allow flexing thereof in a direction lengthwise of specimen 5. These supporting arms, or column-like elements as they might be called, are provided with relatively heavy bases 13 and 14, which as shown in Fig. 1, are removably secured by cap screws 15 and 16, preferably in grooves 12, to top 1 of the normally stationary seismic frame. Hence these supports will be referred to herein as stationary or reaction supports. The inner or center end of grip base 6 is secured to vibratory table 3 to move as a rigid unit therewith by a pair of inflexible column-like elements or arm 17 located at each end of base 6 and provided with an extended base portion 18. The grip base 7 is also connected to table top 3 by a pair of column-like arms 20 which, however, are flexible in the same direction as arms 10 and 11. All of these several pairs of arms have suitable pivotal connections 21, 22, 23 and 24 with the clamp bases 6 and 7 so that as table top 8 moves upward and downward the grips will reciprocate about the upper pivotal ends 22 of stationary supports 10 and 11, although these supports will flex toward and away from each other as the specimen 5 bends downwardly and upwardly at its middle portion tending to shorten or lengthen the straight line distance between the upper pivotal points 21 and 24. By having the single support 17 of inflexible or rigid construction while the other supports are flexible, it is seen that the specimen 5 will be uniformly loaded in the nature of a beam freely supported at each of its two ends. This freedom is the result of the vertical end supports being adapted to adjust themselves individually and relative to each other thereby assuring that only a uniform bending action is induced in the specimen. In Fig. 4 inflexible stationary supports 26 are employed in combination with the remaining supports 27, 28 and 29 being flexible. The arrangement of Fig. 4 is otherwise identical to that shown in the preferred form and hence further description is not necessary except to point out that due to the stationary support 26 being inflexible the specimen 5 will have to shift entirely toward or away from arm 26 with some difference in the bending action of the specimen as compared to the uniform bending action shown in the preferred form.

Each modification may employ the further feature more clearly shown in Figs. 1 and 3 whereby the bending moment of the fixture may be readily changed for specimens of different lengths. To accomplish this an intermediate set of pivot pins 30 and 31 are provided at each end of each clamping base 6 and 7. The two pairs of stationary supporting arms 10 and 11 may upon removal of screws 15 be removed from their pivots 21 and 24 and placed upon pivot pins 30 and 31. This reduces the leverage distance between the stationary and movable arms such as 10 and 17 and 11 and 20, and accordingly vibratory movement of arms 17 and 20 will cause a small bending moment with consequent less force applied to the specimen than when the pivot pins 21 and 24 are employed. The arms 10 and 11 will be held in their new position by replacement of cap screws 15 and 16, only one new set of screw holes 23 in the seismic frame 1 being required.

From the foregoing disclosure it is seen that I have provided an improved fatigue bending fixture that is relatively simple, economical in construction, operation and maintenance and one that may be readily and easily applied to the action and reaction surfaces of a fatigue testing machine. My improved fixture is not only adapted to effect a uniform loading of the specimen but also to have interchangeable leverages without involving any new or additional parts.

It will of course be understood that various changes in details of construction and arrangement of parts may be made by those skilled in the art without departing from the spirit of the invention as set forth in the appended claims.

I claim:

1. A specimen bending fixture for an alternating force fatigue testing machine comprising, in combination, clamping elements adapted to be attached to each end of a specimen, means for pivotally supporting one of said clamping elements to allow oscillatory movement thereof about an axis transversely of the specimen but to prevent at all times rotational movement of the clamping elements about the longitudinal axis of the specimen, means for supporting the other of said clamping elements to allow pivotal movement about an axis transversely of the specimen accompanied by movement in a direction lengthwise of the specimen, and reciprocating means connected to said clamping elements for imparting an alternating movement thereto about their pivotal axes thereby to repeatedly bend the specimen.

2. The combination set forth in claim 1 further characterized in that the pivotal means for allowing movement in a direction lengthwise of the specimen comprises members which are flexible in the lengthwise direction of the specimen and are relatively rigid in substantially all other directions so as to sustain the bending forces of the specimen.

3. The combination set forth in claim 1 further characterized in that the first mentioned pivotal supporting means have provision to allow movement thereof in a direction lengthwise of the specimen, and the means for imparting oscillating movement to the clamping elements is connected thereto between the two pivotal supporting means, whereby the freedom of movement of the two supporting means in a direction lengthwise of the specimen allows uniform loading thereof during bending.

4. The combination set forth in claim 1 further characterized in that certain of said pivotal supporting means and said means for imparting oscillating movement to the clamping elements include members that are flexible in a direction lengthwise of the specimen but substantially rigid in a direction to resist bending forces of the specimen and to transmit a bending force thereto.

5. A specimen bending fixture for an alternating force fatigue testing machine of the type having a reciprocating member and a relatively adjacent stationary member comprising, in combination, clamping elements for a specimen located at each end thereof, column-like members pivotally supporting each of said clamping elements by the stationary member to allow a specimen to flex about an axis transversely thereof while the specimen remains at all times non-rotatable about its longitudinal axis, and column-like members pivotally connected to said clamping elements and adapted for connection to said reciprocating member whereby an oscillating movement is imparted to the clamping elements so that a bending action is adapted to be repeatedly transmitted to a specimen about its said transverse axis while remaining non-rotatable about its longitudinal axis.

6. The combination set forth in claim 5 further characterized in that said column-like members which are supported on the relatively stationary member are flexible in a direction lengthwise of the specimen and at least one of the column-like members which transmits reciprocating movement to the clamping elements is inflexible.

7. The combination set forth in claim 5 further characterized in that said column-like members which are supported on the relatively stationary member are flexible in a direction lengthwise of the specimen and the column-like members which transmit reciprocating movement to the clamping elements include an inflexible column and another column that is flexible in a direction lengthwise of the specimen whereby the inflexible column stabilizes the position of the fixture during operation.

8. The combination set forth in claim 5 further characterized in that the column-like members are each formed in pairs located at each side of the clamping elements, and means whereby the bending moment for the fixture may be varied.

9. The combination set forth in claim 5 further characterized in that the column-like members are each formed in pairs located at each side of the clamping elements, and means whereby the columns which support the clamping elements on the relatively stationary machine member are adapted to have their point of pivotal connection with the clamping elements changed in accordance with the bending moment desired to be transmitted to the specimen.

10. A specimen bending fixture for an alternating force fatigue testing machine comprising, in combination, means for clamping one end of a specimen to bend the same about its transverse axis while the specimen remains non-rotatable about its longitudinal axis, means for clamping the other end of the specimen to bend the same about its transverse axis while the specimen remains non-rotatable about its longitudinal axis, pivots for both of said clamping means, means for allowing the pivots of both of said clamping means to have relative movement toward each other, reciprocating means movable in a direction extending across the length of the specimen, and means for connecting said reciprocating means to points of both of said specimen clamping means for producing a uniform bending moment throughout the test length thereof during repeated bending.

11. A specimen bending fixture for an alternating force fatigue testing machine comprising, in combination, a pair of pivots, means for supporting said pivots so that they are vertically fixed but are relatively laterally movable toward each other, means for clamping the ends of a specimen on said pair of vertically fixed pivots to bend a specimen about its transverse axis while the specimen remains non-rotatable about its longitudinal axis, a second pair of pivots connected to said specimen clamping means and being substantially equally spaced from said vertically fixed pivots, and reciprocating means connected to said second pair of pivots so as to impart an alternating flexing movement to the specimen and produce a uniform bending moment throughout the test length of the specimen during repeated bending thereof.

ALEXANDER J. YORGIADIS.

REFERENCES CITED

The following references are of record in the file of this patent:

UNITED STATES PATENTS

| Number | Name | Date |
| --- | --- | --- |
| 1,518,790 | Hecht et al. | Dec. 9, 1924 |
| 1,559,466 | Schopper | Oct. 27, 1925 |
| 1,678,017 | Midgley | July 24, 1928 |
| 2,154,277 | Moore | Apr. 11, 1939 |
| 2,188,853 | Buckwalter | Jan. 30, 1940 |

FOREIGN PATENTS

| Number | Country | Date |
| --- | --- | --- |
| 493,268 | Great Britain | Oct. 5, 1938 |